W. H. FITCH.
CONTINUOUS HEATING FURNACE.
APPLICATION FILED JAN. 27, 1920.
1,388,419.
Patented Aug. 23, 1921.
4 SHEETS—SHEET 1.
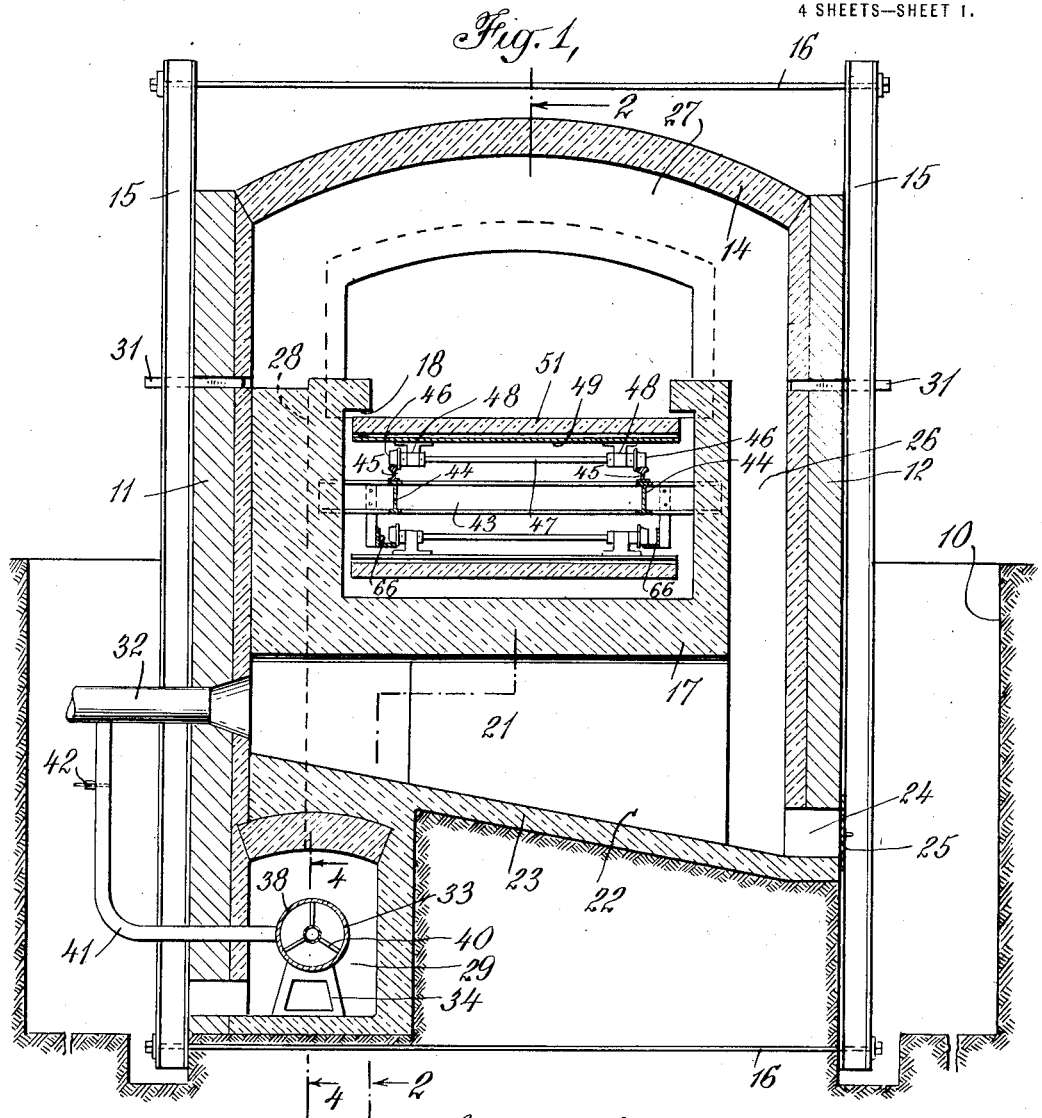
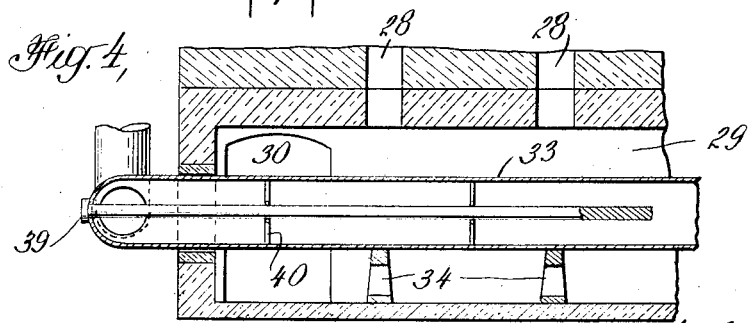
Inventor
William H. Fitch,
By his Attorneys
Pennie, Davis, Marvin & Edmonds W. H. FITCH.
CONTINUOUS HEATING FURNACE.
APPLICATION FILED JAN. 27, 1920.
1,388,419.
Patented Aug. 23, 1921.
4 SHEETS—SHEET 2.
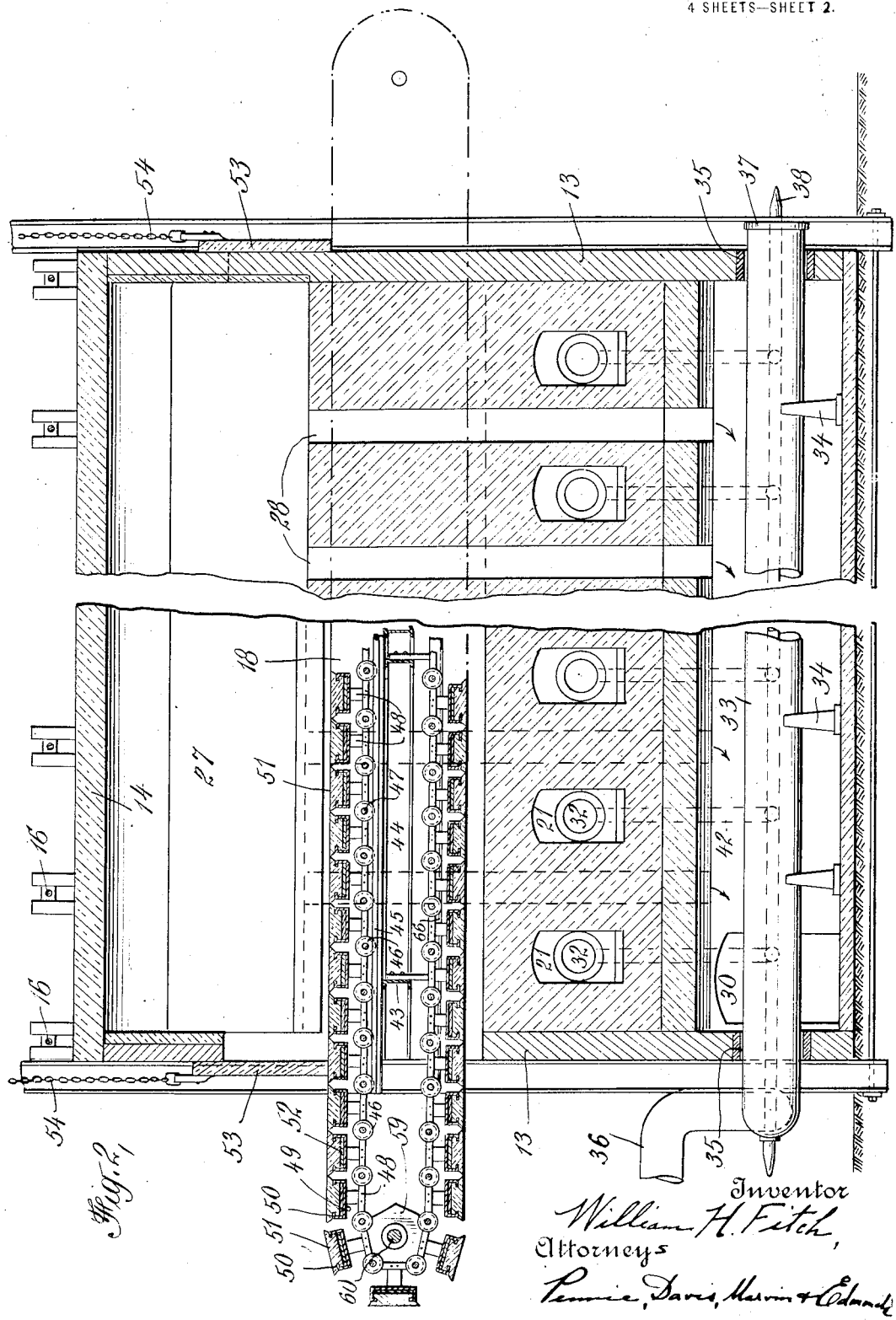

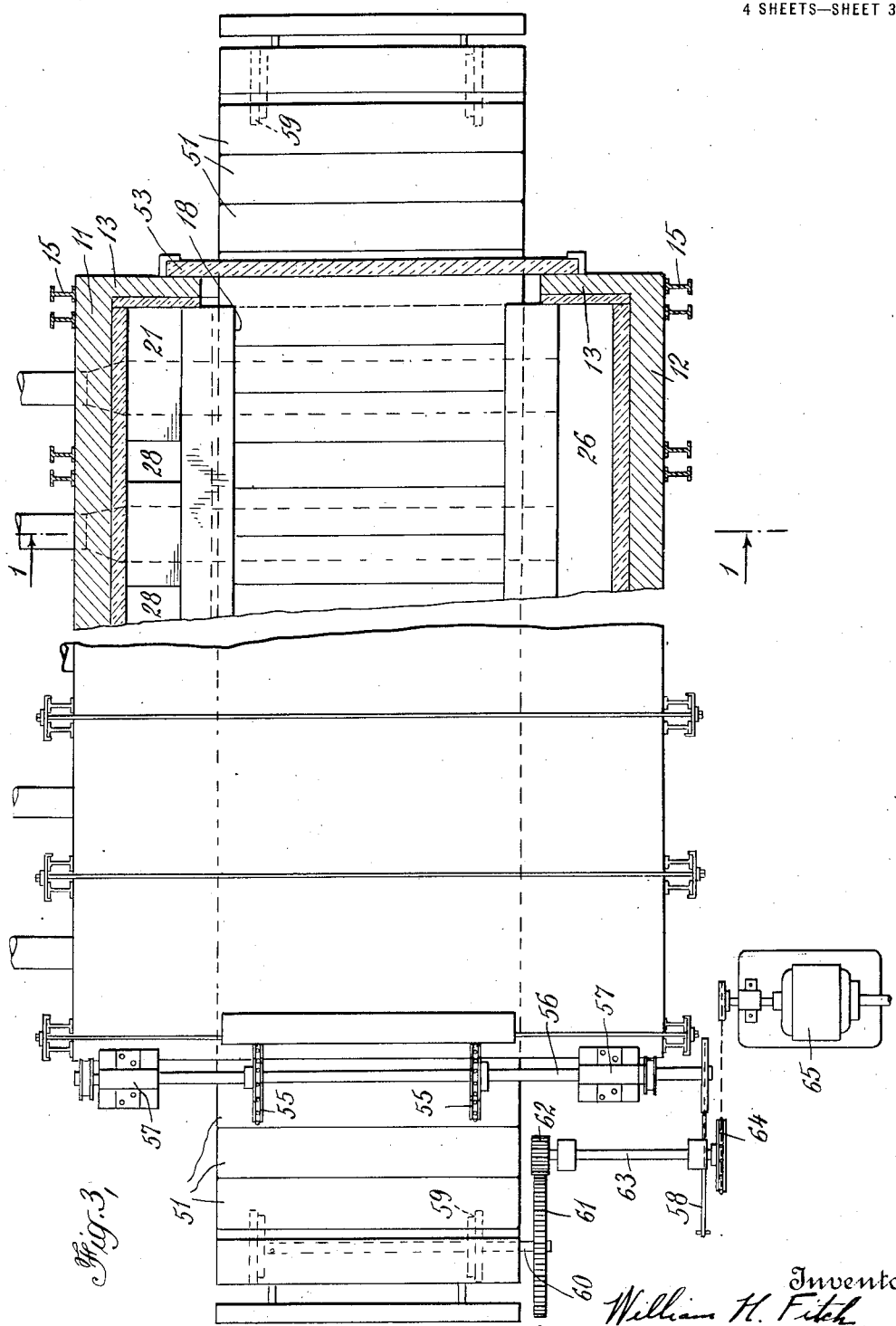

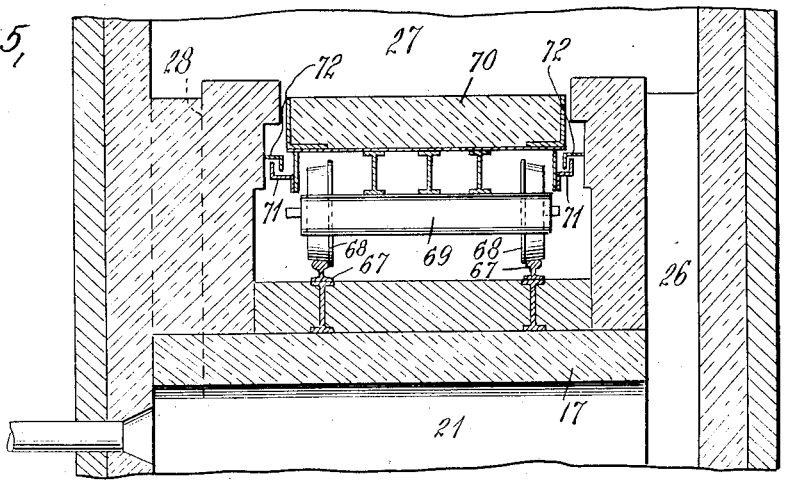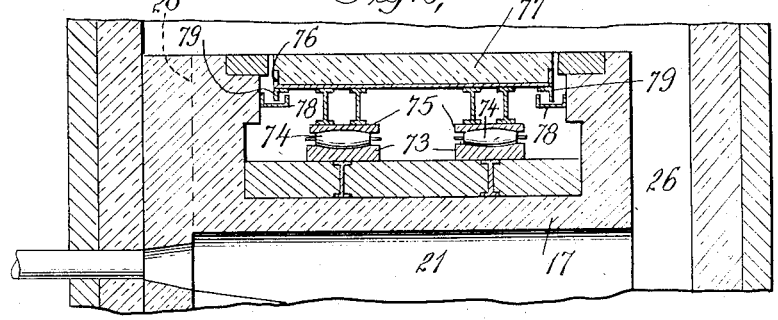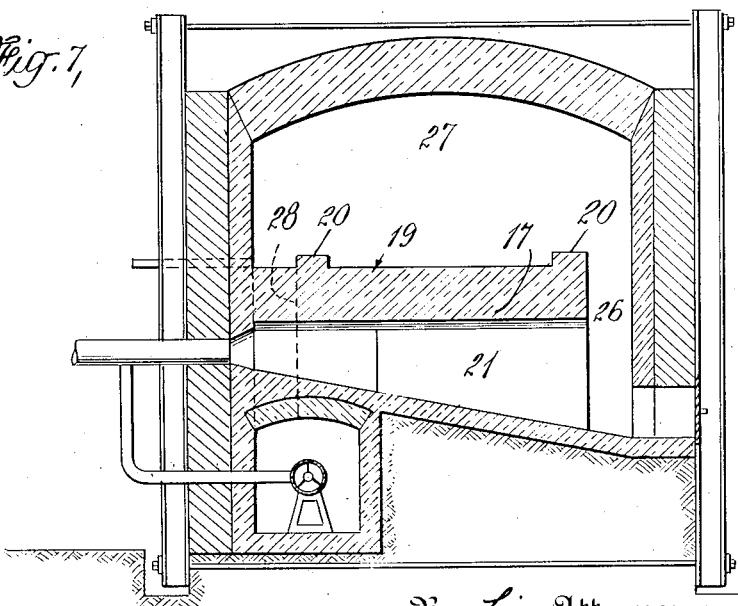

UNITED STATES PATENT OFFICE.

WILLIAM HENRY FITCH, OF ALLENTOWN, PENNSYLVANIA.

CONTINUOUS-HEATING FURNACE.

1,388,419.  Specification of Letters Patent.  Patented Aug. 23, 1921.

Application filed January 27, 1920. Serial No. 354,415.

*To all whom it may concern:*

Be it known that I, WILLIAM HENRY FITCH, a citizen of the United States, residing at Allentown, in the county of Lehigh, State of Pennsylvania, have invented certain new and useful Improvements in Continuous-Heating Furnaces; and I do hereby declare the following to be a full, clear, and exact description of the invention, such as will enable others skilled in the art to which it appertains to make and use the same.

This invention relates to continuous heating furnaces of the underfired type, in which the articles to be heated are transported through the furnace by endless conveyers or cars.

It is an object of the invention to provide a furnace of this type, in which combustion takes place in chambers separate from that in which the articles are heated, but in communication with the latter to permit the hot gases to enter the same. The combustion chambers are so formed that their cross-sectional areas increase in proportion to the distance from the ends through which fuel is introduced. This form of combustion chamber permits the expansion of the gases, whereby their velocity is reduced and precipitation of non-combustible matter may take place, so that the products of combustion enter the heating chamber in relatively clean condition and pass through this chamber into the outlet flues to the stock. Suitable doors are provided in the combustion chamber to permit the residues deposited therein to be removed as desired.

The furnace is designed primarily for the use of pulverized coal, but such fuels as oil, natural gas and manufactured gas may be used. In order to increase the efficiency of the fuels the air that is supplied to them to produce combustion is preheated by means of a recuperative arrangement placed in the outlet flue of the furnace and comprising a tubular member mounted upon suitable supports and provided with a central pipe or rod in heat conducting relation to the tubular member, so that it forms a "core-buster" to eliminate the central zone of the air column in the tubular member, thus producing a higher or more economical temperature of the air that is supplied to the burners of the furnace.

The invention also provides improvements in the conveyer mechanism by which the articles to be heated are transported through the furnace. One particular arrangement in accordance with the invention comprises an endless chain with metallic pans to which refractory linings are attached by means of metallic members, the pans corresponding in shape to the refractories which are adapted to be inserted at the ends of the pans and held in position by a lock bar. The pans are attached to the links of the chain by means of bolts which are inserted before the refractory lining is put in place. This construction provides for the quick and convenient repair or renewal of any parts of the conveyer without shutting down the furnace. It is not, however, intended that the furnace constructed in accordance with this invention should be limited to the employment of this particular form of conveyer, as other types of endless conveyers may be used, or the articles to be heated may be transported through the furnace on cars or similar devices.

The particular nature of the improvements constituting the present invention as well as other objects and advantages thereof, will appear more clearly from a description of certain preferred embodiments, as shown in the accompanying drawings, in which:

Figure 1 is a transverse section of the furnace in which is employed the form of conveyer briefly described above.

Fig. 2 is a longitudinal section of the furnace along the line 2—2 of Fig. 1.

Fig. 3 is a plan view of the furnace, with a portion in section to show the interior construction.

Fig. 4 is a sectional view of a portion of the recuperative device along the line 4—4 of Fig. 1.

Fig. 5 is a transverse sectional view of a furnace in which a modified form of conveyer is used.

Fig. 6 is a cross-sectional view of a furnace having another form of conveyer; and Fig. 7 is a cross-sectional view of a furnace in which the articles are placed upon the floor or in receptacles and pushed through the heating chamber by some outside mechanical force.

In the drawings similar reference characters denote similar parts throughout the several figures in which the parts appear. The furnace is placed within a pit 10 and comprises side walls 11 and 12 and end walls 13. The top of the furnace is in the form of the usual arch 14, and the entire structure is braced and held together by buck staves 15 and tie rods 16 at the top and bottom of the furnace. The inner wall 17 of the furnace is, in the modifications shown in Figs. 1 to 6, inclusive, formed with a channel 18 within which are placed the conveyers or cars for carrying the articles through the furnace. In the modification shown in Fig. 7 the inner wall 19 is in the form of a hearth provided with raised edges 20 at the bridge wall.

Beneath the wall 17 are a number of combustion chambers 21 extending transversely of the furnace and separated longitudinally from each other by vertical partitions 22 which carry the bridge wall. The floor 23 of each of the combustion chambers is inclined downwardly from the side of the furnace at which the fuel is admitted to the opposite side of the furnace, where the chambers are provided with suitable clean-out ports 24 closed by doors 25. From the end of each of the combustion chambers having the greater cross-sectional area a flue or port 26 leads to the heating chamber 27 which extends from one end of the furnace to the other and within which the articles to be heated are placed. Extending downwardly on the burner side of the heating chamber are outlet flues or ports 28 which are located in the side walls between the combustion chambers, as shown most clearly in Fig. 2 and open into a common outlet chamber 29 which communicates with the stack flue 30 of the furnace. Suitable dampers 31 slidably mounted in the side walls 11 and 12 are provided for controlling the inlet flues 26, and the outlet flues 28, so that the volume of the hot gases and consequently the temperature in the heating chamber may be regulated, in addition to the regulation afforded by control of the burners and the amount of fuel that is being supplied to the furnace.

The fuel, which may be oil, gas, pulverized coal, or any other suitable substance, is supplied to the combustion chamber through burner tubes 32 extending through side wall 11 and entering the smaller ends of the combustion chambers. It will be understood that the fuel may be supplied to the burner tubes by any suitable piping or conveyer system, dependent upon the nature of the fuel, and which is not illustrated as it forms no part of the present invention.

It is necessary to supply air to the fuel as it enters the combustion chambers of the furnace, in order that the combustible constituents may be burned. The efficiency of combustion will be increased if the air is preheated before being supplied to the furnace. Air may be taken from any region of the furnace where it may be exposed to the heating effect of the products of combustion, but a recuperative device consisting of a casing 33, preferably of cylindrical cross-section mounted upon piers 34 in the outlet chamber 29 is preferred. This casing extends through bushings 35 in the end walls 13 of the furnace, and at one end is connected to a conduit 36 through which air is supplied by a blower or other mechanism. The other end of the casing 33 is closed by a cap 37 which also serves as the support for one end of a "core-buster" 38 which may be in the form of a pipe or rod mounted at the axis of the casing 33 and held in place at the other end of the casing by a suitable support 39. The "core-buster" may also be supported at intermediate points by suitable spiders 40 extending inwardly from the sides of the casing, but not of sufficient extent to interfere with the flow of air through the casing. The air is carried from the recuperator to the burner tubes by means of pipes 41 which may be provided with suitable dampers 42 for controlling the air supplied to each of the burner tubes.

For the purpose of carrying the articles to be heated into and out of the heating chamber of the furnace, conveyers or cars are provided. In the form of conveyer shown in Figs. 1, 2 and 3, there is arranged within the channel 18 of the bridge wall transverse members 43 and longitudinal members 44 constituting a framework for supporting the conveyer. Upon the top of the framework are rails 45 adapted to receive wheels 46 on the ends of cross-bars 47. The several cross-bars 47 are connected together at their ends by links 48 which are provided with projecting supporting members, to which are attached pans or trays 49 preferably of cast iron, open at the ends and having their upper edges 50 bent inwardly as shown most clearly in Fig. 2. The refractories 51 are arranged to be inserted into the pans through their open ends and are provided with slots adapted to receive the inwardly bent edges of the pans to prevent the refractories from falling out of the pans when they pass along the lower portion of their path, but in order to prevent any possibility of endwise displacement of the refractories, suitable locking bars 52 adapted to be fitted into the ends of the pans may be provided.

The conveyer extends out of each end of the furnace and doors 53 may be provided for closing the opening above the conveyer.

These doors are suspended from chains 54 passing over sheaves 55 on a shaft 56 mounted in suitable bearings 57 at the top of the furnace and, provided at one end with an arm 58 by which the shaft may be rotated to control the position of the door 53. The conveyer passes over sprocket wheels 59 on shafts 60 mounted in suitable bearings beyond the ends of the furnace. One of the shafts 60 is provided with a gear 61 meshing with a pinion 62 on a shaft 63 provided with a pulley or sprocket wheel 64, driven by an electric motor 65 or other source of power which should be controllable to permit the conveyer to be operated at different speeds or continuously or intermittently as may be desired.

For supporting the elements of the conveyer while they are traveling over the lower portion of their path, there is provided a pair of rails 66 suspended from the transverse frame members 43 and over which the wheels 46 travel to prevent the elements of the conveyer from dropping to and being drawn along the bottom of the channel in the bridge wall with possible injury to the faces of the refractories 51.

Instead of an endless conveyer such as described above, the articles to be heated may be placed upon cars or trucks adapted to travel through the channel 18 in the inner wall. One construction of this type that may be employed is shown in Fig. 5 wherein the bottom of the channel is provided with rails 67 for the wheels 68 of a car or truck composed of a suitable frame 69 upon which is mounted a refractory bed 70 upon which the articles to be heated are placed. The frame work of the truck may be provided with angular members 71 which coöperate with corresponding members 72 attached to the walls of the channel in the bridge wall. The two elements 71 and 72 act as a packing or baffles to prevent any substantial amount of hot gas escaping downwardly and into the channel. The trucks may be co-extensive in length with the furnace and may be inserted one at a time with the articles to be heated mounted thereon, or a train of shorter trucks may be passed through the furnace.

In Fig. 6 there is shown a modification of the truck idea. In this arrangement the bottom of the channel between the bridge wall is provided with rails 73 having concave top faces adapted to receive correspondingly shaped rollers 74. Upon the rollers are members 75 provided with correspondingly concave faces and upon which is mounted a framework 76 which carries a refractory bed 77 on which the articles to be heated are placed. In order to form a seal between the heating chamber and the channel in the bridge wall of the furnace, lutes composed of U-shape members 78 fixed to the sides of the channel wall and corresponding members 79 attached to the movable parts of the apparatus may be employed. As in the case of the trucks or cars of Fig. 5 the devices of Fig. 6 may be co-extensive in length with the furnace and adapted to be inserted one at a time into the furnace, or they may be of shorter length so that a number of them may be placed in the furnace at the same time, or any other suitable mode of operating the devices may be employed.

In some cases it may not be necessary or desirable to employ conveyers or cars for transporting the articles through the furnace. In such cases the arrangement shown in Fig. 7 may be employed, and the articles may be placed directly upon the hearth 19, their insertion or removal being performed by suitable tools.

In the general operation of the several embodiments of the invention described above, fuel is supplied in suitable quantity through the burner tube 32, and on account of the increasing cross-sectional area of each combustion chamber space will be provided for the gases to expand as they burn so that their velocity will be reduced. This is particularly important in case the furnace is being fired with pulverized coal. The lessened velocity of the products of combustion will be of advantage in prolonging the time of their passage through the chamber and allow non-combustible matter to be precipitated before the gases enter the flues 26 leading to the heating chamber, so that when the gases enter the heating chamber they are comparatively clean and little or no residue is deposited upon the articles being heated. Such residues as are deposited in the combustion chambers can be removed through the ports 24 from time to time.

During the operation of the furnace, air in suitable quantities to support combustion is supplied to the recuperator. The pipe or rod 38 of this device being inserted in the casing 33 creates a greater heating surface, or in other words forces the air to pass through a smaller area and closer to the casing 33, thus creating a higher temperature of this air, than would be the case if the "core-buster" were not used. By changing the size of the pipes or rods which form the "core-buster," changes in the heating effect of the recuperator can be produced, depending upon the conditions required for most effective protection of the recuperator.

If the furnace provided with a conveyer of the form shown in Figs. 1, 2 and 3 is being employed, the articles to be heated will be placed upon the refractories of the conveyer and the conveyer may be driven continuously at a given speed to keep the articles within the heating chamber for a desired length of time, or the conveyer may be stopped while the articles are being heated and set in motion to convey the articles into the heating chamber, or remove them therefrom, or any other suitable mode of operation may be followed in accordance with desirable practice that can be obtained in furnaces of this character provided with endless conveyers for transporting the articles through the furnace.

Attention is particularly called to the relationship between the heating chamber, the combustion chamber and the outlet chamber. The combustion chamber is below the heating chamber, and the outlet chamber is in turn below the combustion chamber. The hot gases pass through the combustion chamber just underneath the heating chamber to one side of the furnace, then they pass upwardly along one side of the channeled member 17, then laterally through the heating chamber into contact with the articles to be heated on the conveyer belt to the other side of the furnace, then downwardly through the series of flues 28 to the outlet chamber 29.

The hot gases, therefore, pass completely around the heating chamber on all four sides, an arrangement which evidently tends to keep all parts of the channeled member 17 well heated, thus resulting in an improved utilization of the heat of the hot gases, which in turn keeps the channeled member and the heating chamber at a high temperature, using only a comparatively small amount of fuel.

Moreover, the combustion of the fuel takes place in the combustion chamber 21, which is entirely separate from the heating chamber. This is of particular advantage where there are non-combustible ingredients in the fuel, as is the case with pulverized coal, for these non-combustible ingredients collect in the combustion chamber and are not carried into the heating chamber into contact with the articles that are being heated.

While certain preferred embodiments of conveyer mechanism have been shown and described in connection with the furnaces illustrated, it will be understood that other forms of conveyer mechanism may be employed, and also that various changes in the details of construction and the proportioning of the parts of the furnace and the recuperative device may be made without departing from the principles of the invention as defined in the appended claims.

I claim:

1. In a furnace, the combination of a heating chamber, a combustion chamber adjacent thereto, a flue at one side of the furnace for leading gas from the combustion chamber to the heating chamber, and a flue on the opposite side of the furnace for leading gas out of the heating chamber in a direction of flow opposite to the direction of flow in the first mentioned flue, whereby the hot gases pass completely around the heating chamber.

2. In a continuous heating furnace, the combination of a heating chamber, a plurality of combustion chambers beneath the heating chamber, means for supplying fuel to the combustion chambers, a vertical flue between the heating chamber and the combustion chambers, an outlet chamber beneath the combustion chambers, vertical flues leading from the heating chamber to the outlet chamber, means for supplying air to the fuel supplying means, and means for preheating the air by the products of combustion.

3. In a furnace the combination of a heating chamber, a plurality of combustion chambers located underneath the heating chamber and extending transversely with respect thereto, a flue in communication with the several combustion chambers and with the heating chamber, located on one side of the furnace, flues for the escape of the gases from the combustion chamber located on the opposite side of the furnace, whereby the hot gases pass below the heating chamber, upwardly along one side, laterally through the chamber and downwardly along the opposite side of the chamber.

4. In a furnace, the combination of a heating chamber extending longitudinally of the furnace, a combustion chamber of a length substantially equal to the width of the heating chamber located below the heating chamber and extending transversely with respect thereto, said combustion chamber increasing in cross-sectional area throughout its length, an inlet flue at one side of the furnace for leading gases to the heating chamber, an escape flue on the opposite side of the furnace for leading gases away from the heating chamber, the gases flowing in opposite directions in said inlet and escape flues, whereby the gases pass completely around the heating chamber.

5. In a furnace, the combination of a heating chamber, a combustion chamber located below the heating chamber and extending transversely with respect thereto, an outlet chamber located below the combustion chamber, flues on opposite sides of the furnace for respectively leading gases from the combustion chamber to the heating chamber and from the heating chamber to the outlet chamber, and a heat regenerative device located in the outlet chamber.

6. In a continuous heating furnace, the combination of a heating chamber extending from one end of the furnace to the other, a plurality of combustion chambers extending transversely of the furnace beneath the heating chamber and each formed of increasing cross-sectional area, means for supplying fuel to the smaller end of each combustion chamber, a vertical flue leading from the larger end of each combustion chamber to one side of the heating chamber, an outlet chamber extending from one end of the furnace to the other beneath the combustion chambers, and flues leading from the heating chamber to the outlet chamber and placed between the combustion chambers.

7. In a continuous heating furnace, the combination of a heating chamber, a plurality of combustion chambers communicating with the heating chamber, means for supplying fuel to the combustion chambers, an outlet chamber communicating with the heating chamber, a casing in the outlet chamber, means for supplying air to the casing to be heated therein, means within the casing for increasing the heating effect upon the air therein, and means for conducting the heated air from the casing to each of the fuel supplying means.

8. In a continuous heating furnace, the combination of a heating chamber, a plurality of combustion chambers communicating with the heating chamber, means for supplying fuel to the combustion chambers, an outlet chamber communicating with the heating chamber, a casing in the outlet chamber, means for supplying air to the casing to be heated therein, means extending centrally and longitudinally of the casing and in heat conducting relation therewith for increasing the heating effect upon the air therein, and means for conducting the heated air from the casing to each of the fuel supplying means.

9. In a continuous heating furnace, the combination of a heating chamber, a plurality of combustion chambers beneath the heating chamber and separated therefrom by a wall provided with a channel, means for supplying fuel to the combustion chamber, outlet conduits for the waste gases, and means movably mounted in the channel of the wall, for conveying articles to be heated through the heating chamber.

10. In a continuous heating furnace, the combination of a heating chamber, a plurality of combustion chambers beneath the heating chamber and separated therefrom by a wall provided with a channel, means for supplying fuel to the combustion chamber, outlet conduits for the waste gases, a framework in the channel of the wall, rails on the framework, and means mounted on the rails for transporting articles through the heating chamber.

11. In a continuous heating furnace, the combination of a wall spaced from the top of the furnace to form a heating chamber, a plurality of combustion chambers beneath the wall, means for supplying fuel to one end of each of the combustion chambers, a flue extending through the wall from the other end of each combustion chamber to the heating chamber, an outlet chamber beneath the combustion chambers, and flues extending through the wall from the heating chamber to the outlet chamber and located between the combustion chambers.

12. In a continuous heating furnace, the combination of a heating chamber, extending from one end of the furnace to the other, a plurality of combustion chambers extending transversely of the furnace, means for supplying fuel at one end of each combustion chamber, a flue leading from the other end of each combustion chamber to one side of the heating chamber, located below the combustion chamber, an outlet chamber extending from one end of the furnace to the other, a conduit in said outlet chamber exposed to the heating effect of the products of combustion, and means for conducting preheated air from the conduit to each of the fuel supplying means.

13. In a continuous heating furnace, the combination of a heating chamber, a combustion chamber beneath the heating chamber, a flue on one side of the furnace for leading gases from the combustion chamber to the heating chamber, a flue on the opposite side of the furnace for leading gases out of the heating chamber, the hot gases in said flues flowing in opposite directions, whereby the hot gases pass completely around the heating chamber, and an endless belt conveyer for carrying articles to be heated through the heating chamber.

14. In a continuous heating furnace, the combination of a heating chamber the bottom of which is formed by a channeled member, a combustion chamber below the channeled member, an outlet chamber, flues on opposite sides of the furnace for respectively leading gases from the combustion chamber to the heating chamber and from the heating chamber to the outlet chamber, and an endless belt conveyer for carrying articles to be heated through the heating chamber.

15. In a continuous heating furnace, the combination of a heating chamber, a channeled member forming the bottom of the heating chamber, a combustion chamber below the heating chamber, a flue at one side of the furnace for leading gases upwardly from the combustion chamber to the heating chamber, a flue at the other side of the furnace for leading gases downwardly from the heating chamber, and an endless belt conveyer, mounted to move in the channeled member, the lower stretch of the conveyer belt being positioned near the bottom of the channeled member, while the upper stretch is exposed to the hot gases passing through the heating chamber.

16. In a furnace, the combination of a heating chamber, a horizontally extending combustion chamber beneath the heating chamber of an increasing cross-sectional area from one end to the other, so that the fuel and gas entering at the smaller end have their velocity decreased and so that non-combustible ingredients of the fuel collect near the large end of the combustion chamber, means for feeding fuel and air to the smaller end of the combustion chamber, means for leading hot gases from the larger end of the combustion chamber to the heating chamber, and a door opening into the larger end of the combustion chamber for the removal of the non-combustible substances.

In testimony whereof I affix my signature.

WILLIAM HENRY FITCH.